Nov. 4, 1952         E. A. RODGERS         2,616,680

RETORT AND METHOD OF HEATING SAME

Filed Dec. 30, 1946         4 Sheets-Sheet 1

Elbert A. Rodgers
INVENTOR.

BY

HIS ATTORNEY.

Nov. 4, 1952 — E. A. RODGERS — 2,616,680
RETORT AND METHOD OF HEATING SAME
Filed Dec. 30, 1946 — 4 Sheets-Sheet 2

Elbert A. Rodgers
INVENTOR.

HIS ATTORNEY.

Nov. 4, 1952 — E. A. RODGERS — 2,616,680
RETORT AND METHOD OF HEATING SAME
Filed Dec. 30, 1946 — 4 Sheets-Sheet 3

Elbert A. Rodgers
INVENTOR.

BY
HIS ATTORNEY.

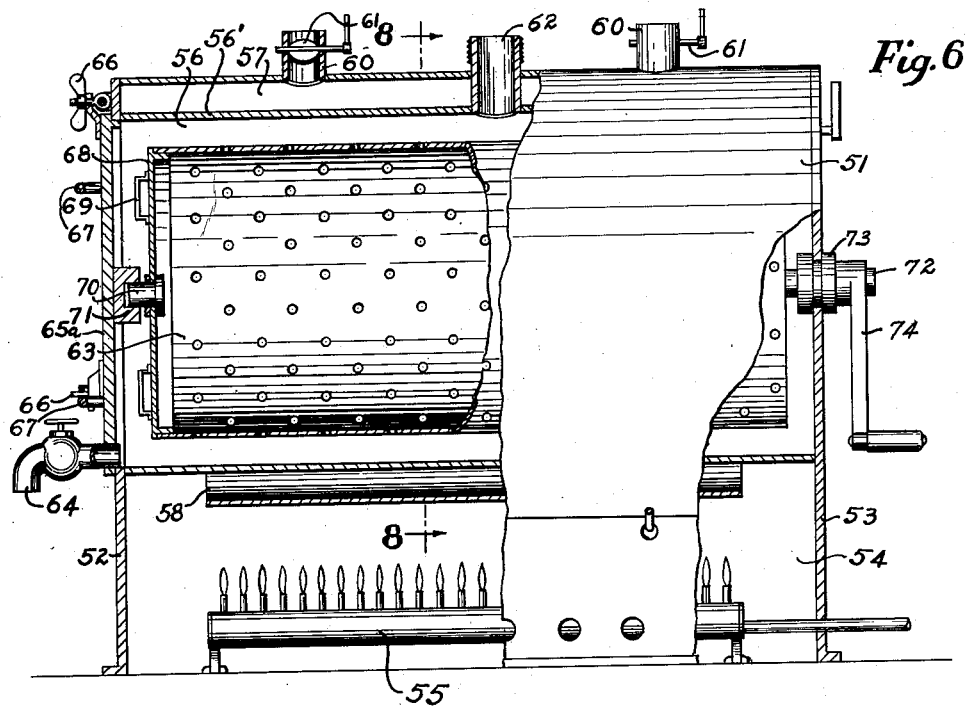
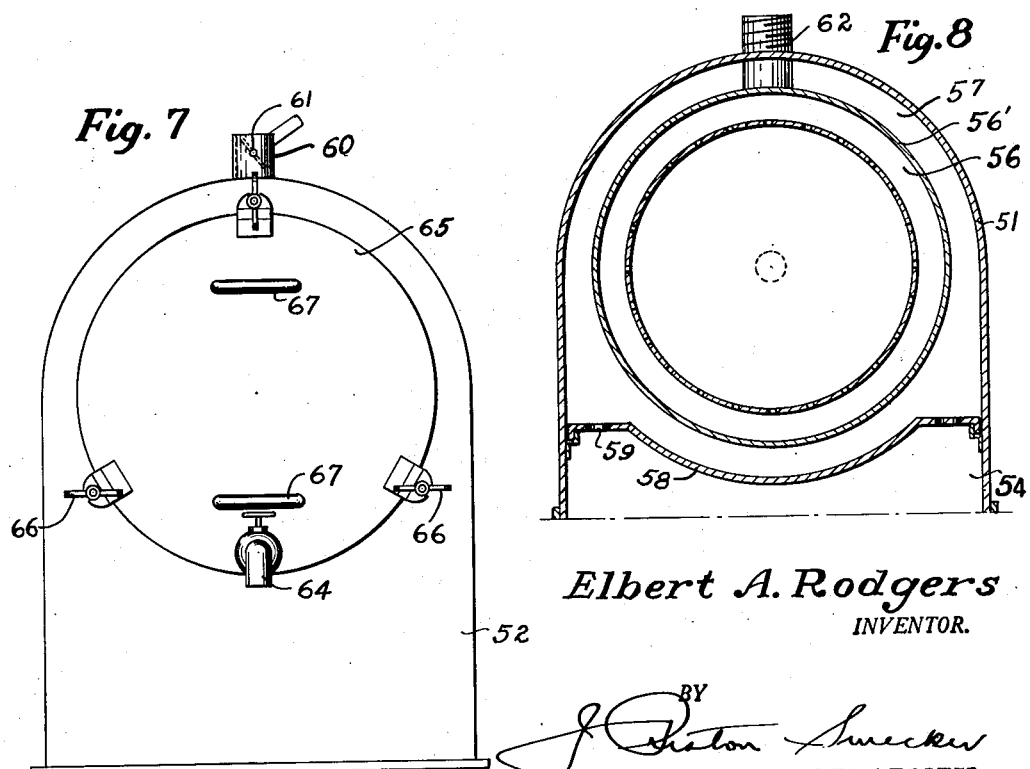

Patented Nov. 4, 1952

2,616,680

UNITED STATES PATENT OFFICE 2,616,680

RETORT AND METHOD OF HEATING SAME

Elbert A. Rodgers, Altus, Okla.

Application December 30, 1946, Serial No. 719,290

3 Claims. (Cl. 263—41)

This invention relates to improvements in retorts, particularly of the character used for rendering animal and vegetable matter for the extraction of fats and oils therefrom through the application of heat.

Heretofore, the devices provided for this purpose have used steam jacketed vessels for heating the materials to be treated, but such devices have not been satisfactory. They have required the use of a boiler and control means for the temperature and pressure, as well as provisions for keeping the fire burning uniformly, which variety of controls and the provision of steam heat have rendered such devices expensive, complicated in construction and operation, and these have also been unsatisfactory from a heating standpoint, because of the lack of uniform heat and the heat loss that results therefrom.

The primary object of this invention is to provide for the heating of such materials by means of dry heat, such as hot air or hot gases other than steam, and to circulate such heating fluids in heat exchange relation with the animal or vegetable matter, during the processing thereof, to provide the maximum efficiency in the retort.

A further object of the invention is to improve the construction of retorts of this character to provide the maximum efficiency of heating of the materials with a minimum of heating means and equipment in processing the materials for the extraction of fats and oils therefrom.

Still another object of the invention is to provide for the heating of the animal or vegetable matter by dry heat applied thereto in a retort, combined with an agitation of the material which will prevent sticking and insures the application of uniform heating thereof, whereby the desired heating effect may be obtained with a maximum of efficiency and yet with simplified equipment.

In one embodiment of the invention, the hot air generated by a furnace may be used to heat the materials, by circulating said hot air and the products of combustion directly from the burner around the heating chamber in heat-exchange relation therewith, where the maximum heat absorption may be obtained and efficiency of operation, but in a structure that is extremely simple and inexpensive to provide and operate. The heated products of combustion are circulated around the heating chamber to obtain the maximum retention of heat therefrom, and yet provision is made for preventing the flame from coming into direct contact with the heating chamber, whereby the material may be heated to the desired extent in a minimum of time and fuel and obtaining uniform heating in an efficient manner.

The invention is illustrated in certain embodiments thereof, in the accompanying drawings in which:

Fig. 6 is a side elevation partly in section through a modified form of retort embodying this invention;

Fig. 7 is an end elevation thereof, taken on the line 7—7 of Fig. 6; and

Fig. 8 is a cross section through the retort on the line 8—8 of Fig. 6.

Referring to the form of retort shown in Figs. 1 to 5, and illustrated as one embodiment of the invention, this is constructed with an outer shell generally indicated at 1, enclosing the major parts of the retort. The shell 1 encloses a combustion chamber 2 at one end portion of the retort within which is disposed a fire brick structure 3, enclosing a burner 4, which burner is at the bottom of the combustion chamber. Any suitable form of burner may be used for the purpose as desired, such as an oil or gas burner, that will provide the required amount of heat for the purpose.

Figure 3:
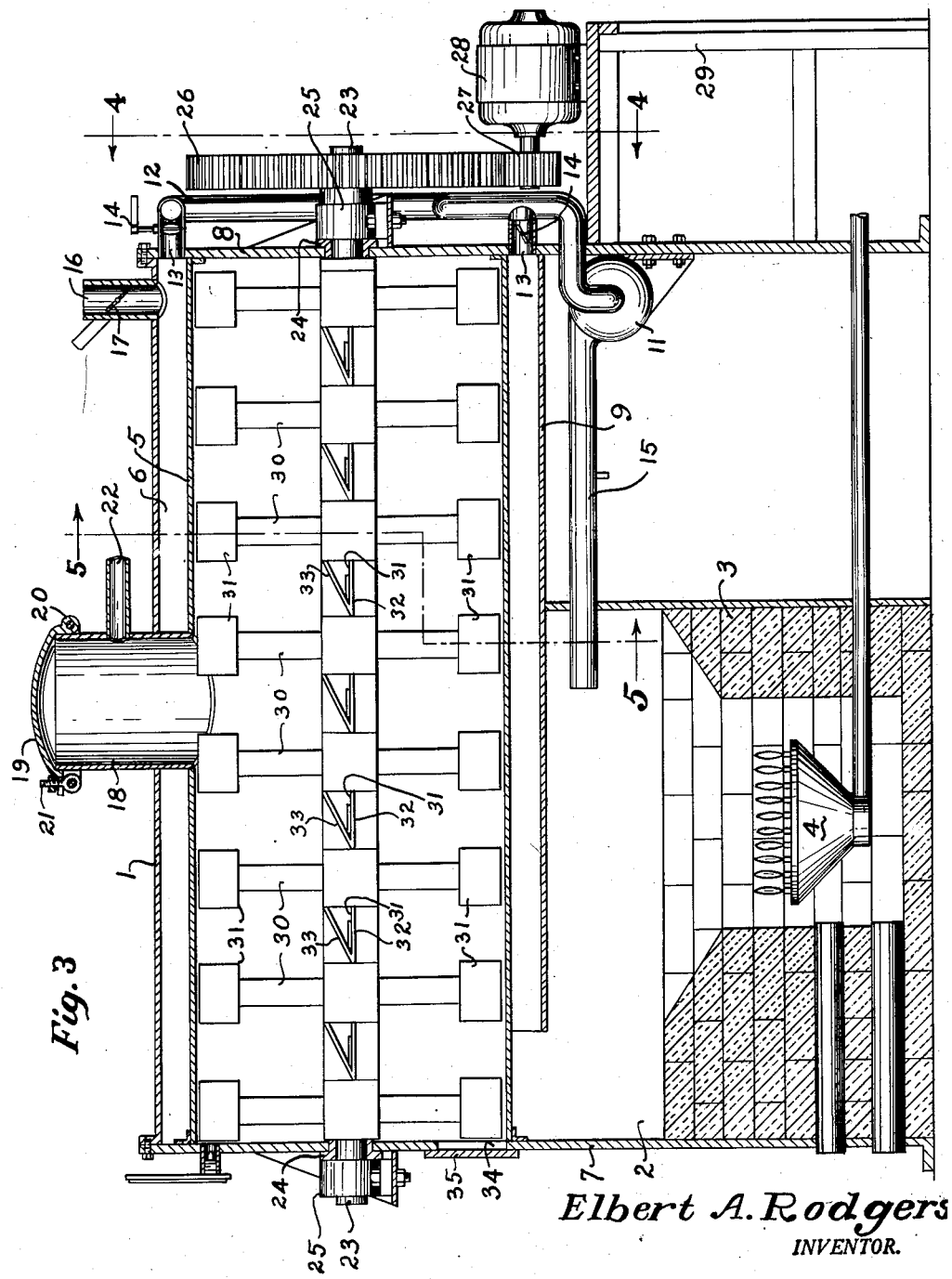
Fig. 3 is a longitudinal sectional view therethrough, with parts in elevation.
Figure 4:
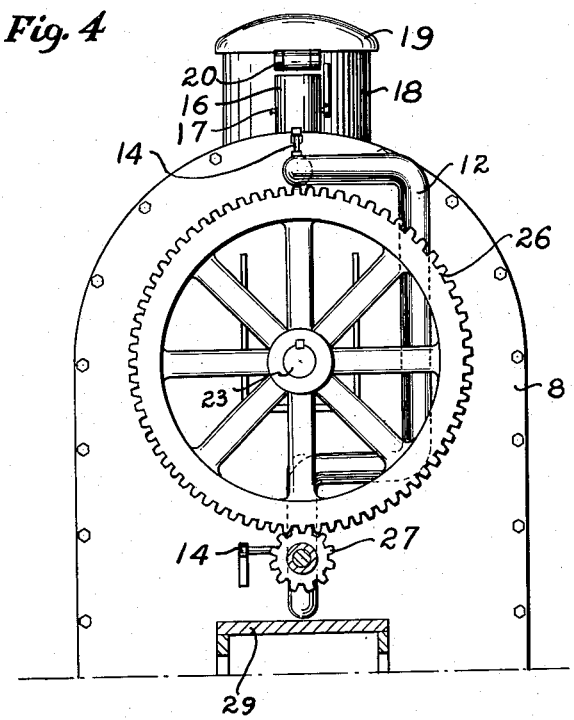
Fig. 4 is an end elevation at the opposite end from Fig. 2, partly in section on the line 4—4 of Fig. 3.
Figure 5:
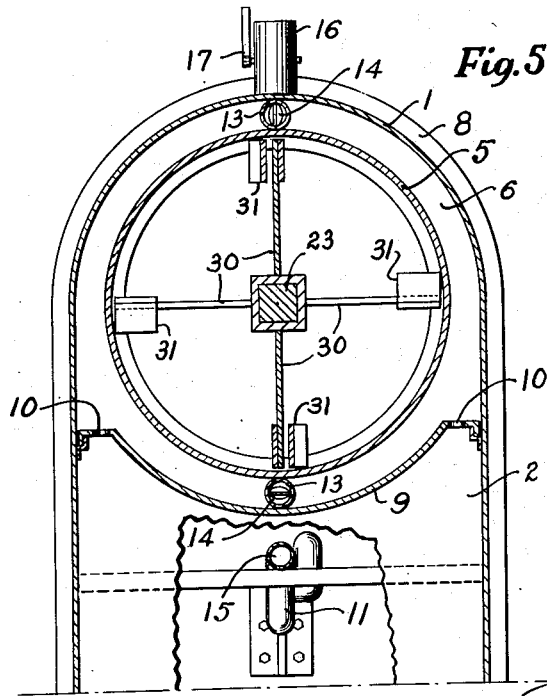
Fig. 5 is a vertical cross section of the retort on the line 5—5 of Fig. 3.

Extending lengthwise of the shell 1, in the upper portion thereof, is a cylindrical heating chamber 5, preferably spaced from the surrounding wall of the shell 1, as shown in Figs. 3 and 5, with a circulating passage 6 therebetween for the passage of heated air currents. The heating chamber 5 is mounted securely at its opposite ends on the respective end heads of the shell 1, which heads are designated at 7 and 8 and are secured in permanent relation to the shell 1.

The heating chamber 5 is partially enclosed at the bottom by a baffle plate 9 (Figs. 3 and 5) which extends lengthwise from the head 8 toward the opposite head 7, but may be spaced from the latter, if desired, to permit freedom of circulation of the products of combustion into the circulating chamber 6. The baffle plate 9 is secured to opposite sides of the shell 1 and may be provided with openings 10 therein, along its opposite edges at a point within the combustion chamber 2 for the circulation of heated air currents from within the combustion chamber into the circulating chamber 6.

The heated air currents from within the combustion chamber 2 will be drawn into the circulating chamber 6 adjacent one end of the heating chamber 5 and will pass uniformly throughout the length of the circulating chamber 6 around the heating chamber. This may be forced circulation, if desired, for which purpose a blower 11 is connected at its intake side with a pipe 12 that has connections 13 into the circulating chamber 6 through the head 8 of the shell. Valves are shown at 14 for controlling these connections, which valves may be operated manually or thermostatically, as desired. The discharge side of the blower 11 is shown at 15, leading into the combustion chamber 2 for recirculation and re-heating of the gaseous fluid. Thus the fan 11 sucks the gaseous fluid out of the circulating chamber 6, after it passes throughout the length of the heating chamber 5, around the latter, and in heat-exchange relation therewith, and then returns this gaseous fluid for re-heating and re-circulation, if desired. The extent of re-circulation will be controlled by the valves 14 that will regulate the amount of air withdrawn from the chamber 6. This chamber may be vented, if desired at 16, which vent is controlled by a valve 17, which likewise may be controlled either manually or thermostatically.

Provision is made for charging the retort with animal or vegetable matter through a top opening sleeve 18, that extends through the shell 1 to the heating chamber 5, opening into the interior of the latter. This sleeve 18 is adapted to be closed in tight relation by means of a cover 19, hinged at 20, at one side of the sleeve and provided with an eye bolt clamp 21, at the opposite side thereof for drawing the cover in tightly sealed relation upon the sleeve 18. A vent line 22 is shown as connected with one side of the sleeve 18 for applying a pressure or vacuum to the interior of the heating chamber 5, which pressure or vacuum may be maintained therein by a suitable control valve (not shown), connected with the vent line 22. A vacuum may be desirable especially where the material is to be dehydrated within the retort.

Provision may be made for agitating the material within the heating chamber 5, if desired. Accordingly, I have shown a shaft 23 extending lengthwise centrally through the heating chamber 5 and through packing glands 24 in the heads 7 and 8 of the shell. The shaft 23 is journaled in bearings 25 mounted on the heads 7 and 8, externally of the shell for freedom of rotation of the shaft. While any suitable means may be provided for operating the shaft, this is shown as being keyed to a gear 26, meshing with a pinion 27 mounted on the armature shaft of an electric motor 28, which motor is shown as seated upon a supporting structure 29, externally of the retort. An appreciable gear reduction is provided through the gearing 26—27, as will be evident, because only slow rotation of the shaft is desirable, although this may vary, according to the character of material being processed.

Mounted on the shaft 23 are series of radially extending arms 30, each of which arms carries at its outer end an agitating paddle 31. As will be evident from the paddles viewed edgewise, substantially on the axis of the shaft 23, in Fig. 3, each paddle 31 has a face 32 extending parallel with the axis, and a face 33 extending at an acute angle thereto. Therefore, when the paddles 31 are turned in one direction within the heating chamber 5, the material will be agitated by the faces 32. However, when these paddles are turned in the opposite direction, the material will be moved lengthwise toward the opening for unloading, as shown in Fig. 3, by engagement thereof with the faces 33.

Figure 1:
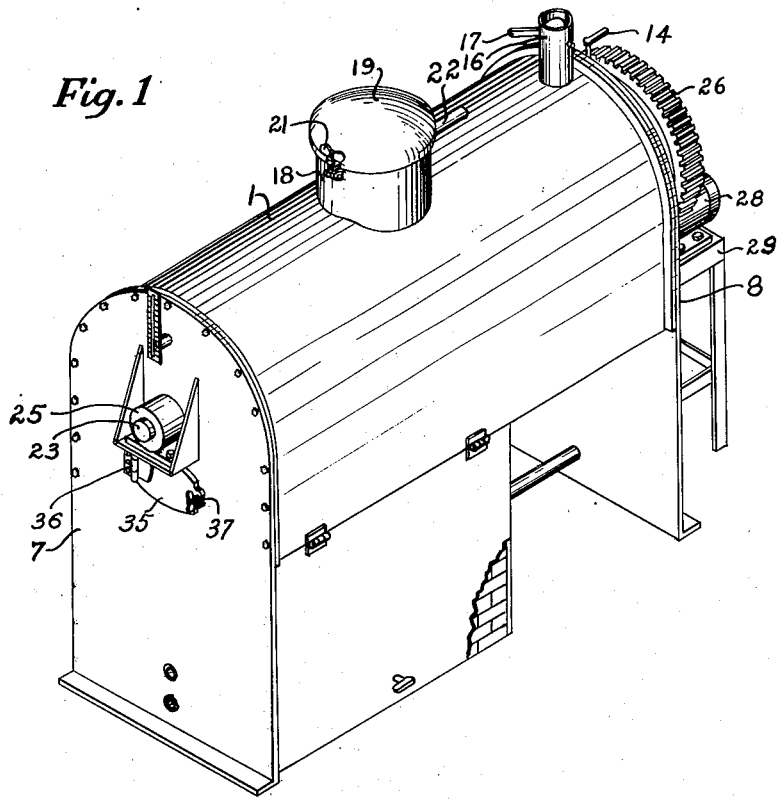
Fig. 1 is a perspective view of one form of retort embodying this invention.
Figure 2:
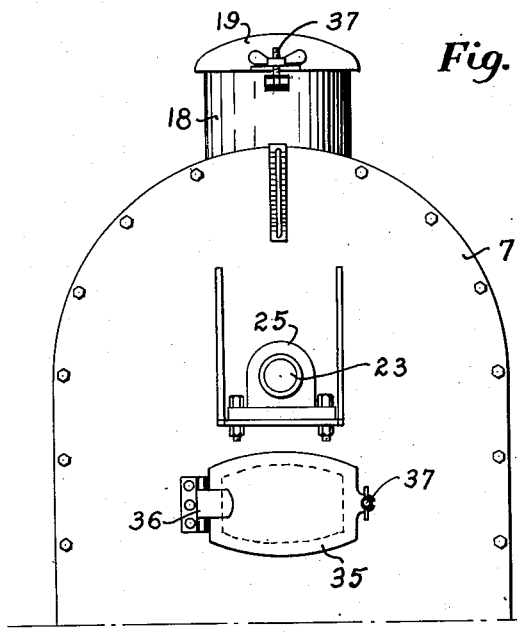
Fig. 2 is an end elevation of the upper portion thereof.

A discharge opening is provided at 34 in the bottom portion of the heating chamber 5, normally closed by a door 35. As shown in Fig. 2, the door 35 is hinged at 36, at one side thereof, and is provided with a clamping bolt 37 at the opposite side thereof for securing the door in sealed relation over the opening 34.

In the operation of the retort, a charge of material is injected into the heating chamber 5 through the opening sleeve 18, after which the door 19 is closed and sealed in tight relation therewith. The motor 28 is operated in a direction to cause the flat sides 32 of the paddles to be moved toward the material and to cause an agitating action thereof in the heating chamber 5.

The burner 4 will be operated to supply the desired heat to the heating chamber. The heated air currents thereof and gaseous products of combustion will be directed up from the combustion chamber 2 into and through the circulating chamber 6, in heat-exchange relation with the interior of the heating chamber 5. This circulation may be continued and the gaseous products re-circulated through the pipes 12 and 13, the blower 11, and the pipe 15, according to the disposition of the valves 14.

In applying heat to the heating chamber 5 by utilizing the hot gases from the combustion chamber, no heat loss is permitted as would be the case where the heating chamber is heated through an intermediate media, such as hot water or steam, that would result in a considerable loss, due to breaking down of the molecular structure of the water to produce steam; and further heat loss would result from the conduction of the steam to the desired point of use with resultant condensation, which has presented a serious problem heretofore due to the trapping of the condensed moisture.

It will be appreciated that the processing of the animal or vegetable matter in a chamber heated directly by the products of combustion and gaseous fluids, and agitated in the manner described, produces a high efficiency of heat recovery, thereby permitting a greater volume of material to be processed at less cost and with less expensive equipment than has been possible heretofore.

After the material has been processed through heating to the desired extent in the heating chamber 5, the motor 28 may be reversed and the paddles 31 will be turned in the opposite direction, causing the faces 33 to engage the material. The angular disposition of these faces will tend to move the material toward the discharge opening 34. With the cover removed, the material may be discharged through this opening into a suitable receptacle, ready for subsequent operations.

Referring to the form of the invention shown in Figs. 6 to 8, the retort is constructed with a shell 51, having heads 52 and 53, at opposite ends thereof and enclosing a combustion chamber 54 in the bottom portion of the shell. A burner 55 is mounted in the combustion chamber 54 for supplying hot gaseous fluid for heating the materials.

A cylindrical wall 56' extends about the upper portion of the shell 51 and encloses a heating chamber 56 therein. The wall 56' is fixed at its opposite ends to the heads 52 and 53, but is spaced from the shell 51, to provide a circulating chamber 57 therebetween. A baffle 58 extends transversely beneath the wall 56', as shown in Fig. 8, and is fixed at opposite sides to the shell 51. The plate 58 extends preferably throughout the length of the space over the burner 55, but is shown as terminating short of each adjacent head to allow passage of the gaseous heating fluid to the circulating chamber 57. The opposite edges of the baffle plate 58 may be provided also with perforations 59 therein, to facilitate the circulation of the fluid into and through the chamber 57.

The chamber 57 is provided also with vents 60 in the top thereof which are shown as provided with control valves 61 that may be regulated manually or thermostatically as desired. A vent pipe is shown also at 62, connected with the heating chamber 56 which may be valve-controlled, if desired, so as to maintain a pressure or vacuum within the heating chamber.

In this form, the material is adapted to be processed within a rotatable drum designated generally at 63, extending lengthwise in the heating chamber 56, which drum 63 is perforated to allow the oils and fats to drain therefrom into the bottom of the heating chamber. A valved drain pipe is shown at 64, for withdrawing such liquids therefrom.

The head 52 of the shell is provided with an opening therein, normally closed by a cover plate 65 held in place by clamping bolts 66, provided at intervals around the periphery of the cover plate. This cover plate also has handles 67 for manipulation thereof. Upon removal of the cover plate 65, access may be had to the drum 63.

The drum 63 has one end 68 thereof removable and normally held closed by a tight fit with the wall of the drum. Handles 69 are provided on the end plate 68 for removal and replacement of the end plate.

This end plate 68 carries a trunnion 70 journaled in a bearing 71, on the inner face of the cover plate 65, to provide a journal for one end of the drum. The opposite end of the drum has a trunnion 72 formed by a stub shaft which projects through a packing gland 73 that forms a bearing therefor in the head 53 of the shell. The extended end of the trunnion 72, is shown as provided with an operating handle 74, although power-operated means may be provided therefor, if desired.

In this form of the invention, the material may be introduced into the drum 63, upon removal of the cover plate 65 and the end wall 68, after which these may be replaced and secured in tight relation. The drum thus is journaled on the trunnions 70 and 72, for rotation within the heating chamber.

The operation of the burner 55 causes heated gaseous fluid of an entirely dry character to be circulated through the circulating chamber 57, in heat-exchange relation with the heating chamber 56. This may be continued until the material has been heated sufficiently and agitated by the rotation of the drum 63, for the desired processing operation. The oil or fat liberated from the material during this processing will be collected at the bottom of the chamber 56 and may be drawn off through the connection 64.

After completion of the heating operation, the material may be removed from the heating drum 63, by removal of the cover plate 65 and the end wall 68 of the drum. A new charge of material then may be introduced and the operation repeated.

The retort may be used for cooking dead animal flesh, which, when properly processed, is removed and the grease pressed therefrom for use as soap, fats, etc; the residue (meat cake) is used in poultry, stock and dog food.

However, a similar retort may be used on vegetable matter, such as stalks, etc., and produce a high B. t. u. gas cheaply. Castor beans, soy beans and various other vegetable matter can be processed successfully in like manner, as well as various other materials.

While the invention has been illustrated and described in certain embodiments, it is recognized that variations and changes may be made therein without departing from the invention, except as specified in the claims.

I claim:

1. A retort comprising a heating chamber adapted to receive material therein for processing, means forming a circulating passage around said heating chamber, a combustion chamber having means of communication with the passage around the heating chamber for circulating products of combustion to said passage, a burner in said combustion chamber, and suction means in communication with said passage at points above and below said heating chamber for withdrawing products of combustion through and out of the circulating chamber and discharging said circulated products of combustion into said combustion chamber for re-heating by the burner.

2. A retort comprising a heating chamber adapted to receive material therein to be heated, means forming a circulating passage about said heating chamber from end to end thereof, a combustion chamber below said heating chamber and in communication with one end of said circulating passage, a compartment below said heating chamber adjacent to said combustion chamber, a blower in said compartment in communication with said combustion chamber, duct means positioned outside of said heating chamber in communication with upper and lower portions of said circulating passage at the end thereof remote from said combustion chamber and in communication with the suction of said blower, and valve means positioned in said duct means for regulating the withdrawal of products of combustion from said upper and lower portions of said circulating passage to said blower.

3. A retort comprising a heating chamber adapted to receive material therein to be heated, means forming a circulating passage about said heating chamber from end to end thereof, a combustion chamber below said heating chamber and in communication with said circulating passage at one end thereof, duct means outside of said heating chamber communicating with upper and lower portions of said circulating passage at the end thereof remote from said combustion chamber, a valve for regulating the withdrawal of products of combustion from said upper portion of said circulating passage to said duct means, a further valve for regulating the withdrawal of the products of combustion from said lower portion of said circulating passage to said duct means, and a blower communicating with said duct means and with said combustion chamber for withdrawing products of combustion from said circulating passage and returning the same to said combustion chamber.

ELBERT A. RODGERS.

REFERENCES CITED

The following references are of record in the file of this patent:

UNITED STATES PATENTS

| Number | Name | Date |
|---|---|---|
| Re. 8,479 | Hall | Nov. 5, 1878 |
| 136,129 | Broadnax | Feb. 25, 1873 |
| 180,415 | Clarke et al. | Aug. 1, 1876 |
| 200,520 | Downie | Feb. 19, 1878 |
| 1,446,994 | Sieben | Feb. 27, 1923 |
| 1,524,340 | Darrah | Jan. 27, 1925 |
| 1,699,443 | Owen | Jan. 15, 1929 |